United States Patent [19]

Fujimoto et al.

[11] Patent Number: 5,078,355
[45] Date of Patent: Jan. 7, 1992

[54] PAN HEAD MOUNTING HEAD OF TRIPOD FOR PHOTO AND VTR CAMERAS

[75] Inventors: Kazuo Fujimoto, Tokyo; Hiroyoshi Tsuruta, Kanagawa, both of Japan

[73] Assignee: Asanuma & Company Ltd., Tokyo, Japan

[21] Appl. No.: 608,424

[22] Filed: Nov. 2, 1990

[51] Int. Cl.$^5$ ............................................. F16M 11/12
[52] U.S. Cl. ...................................... 248/183; 248/278
[58] Field of Search ............... 248/183, 278, 543, 186, 248/187, 565, 170, 542, 485; 352/243; 354/293, 81

[56] References Cited

U.S. PATENT DOCUMENTS

| | | | |
|---|---|---|---|
| 2,143,606 | 1/1939 | Mooney | 248/183 |
| 2,226,827 | 12/1940 | Moore | 248/183 |
| 2,551,971 | 5/1951 | Sandager | 248/183 |
| 2,586,721 | 2/1952 | Rubin | 248/183 |
| 2,886,276 | 5/1959 | Epperson | 248/183 |
| 3,712,571 | 1/1973 | Miller | 248/183 |
| 4,477,149 | 10/1984 | Crespy | 248/542 X |
| 4,673,268 | 6/1987 | Wheeler | 352/243 |
| 4,687,170 | 8/1987 | Beaver | 248/543 |
| 4,697,772 | 10/1987 | Kosugi | 248/278 X |
| 4,886,230 | 12/1989 | Jones | 248/170 |

Primary Examiner—J. Franklin Foss
Attorney, Agent, or Firm—Schwartz & Weinrieb

[57] ABSTRACT

A pan head mounting head of a tripod for photo and VTR cameras in which a single pan rod for swinging and shifting the pan head to the photographing direction is provided, and by changing the degree of clamping of this rod, the vertical swing movement or both the vertical and horizontal swing movements can be locked.

7 Claims, 3 Drawing Sheets

PAN HEAD MOUNTING HEAD OF TRIPOD FOR PHOTO AND VTR CAMERAS

BACKGROUND OF THE INVENTION

1) Field of the Invention

This invention relates to an improvement of pan head mounting head for swinging the pan head horizontally or vertically with respect to a tripod for photo and VTR cameras, and more particularly to a pan head mounting head of a tripod for photo and VTR cameras in which the horizontal swing and vertical swing movements of the pan head can be individually or separately locked by means of one clamping knob called the knob shaft.

2) Description of the Related Art

Tripods for photo and VTR cameras provided with a pan head mounting head for swinging the pan head horizontally or vertically have conventionally been used. The pan head mounting head of this type is capable of locking the horizontal swing and vertical swing movements of the pan head by means of either one of the following structures:

(1) Two independent clamping knobs are provided for locking the horizontal swing and vertical swing movements of the pan head individually.

(2) One clamping knob is provided for locking the horizontal swing and vertical swing movements of the pan head simultaneously.

In accordance with the structure (1), since the horizontal swing and vertical swing movements of the pan head can be locked independently, it is possible to perform a horizontal swing movement only while the vertical swinging action is locked, for example. In this structure, however, a camera man is required to operate the two clamping knobs with both hands with the result that his hands will be occupied while additional camera operations will be required. Therefore, if the camera man needs to hold a lighting instrument or the like, it will be very difficult to perform the photography operations.

On the other hand, in accordance with the structure (2), the camera man can operate the knob with one hand. However, since the swinging actions in both directions are simultaneously locked, it will be difficult to operate the camera especially during the time of video tape recording.

OBJECT OF THE INVENTION

This invention has therefore been made with a view to solving the foregoing problems, and an object of this invention is to provide a pan head mounting head of a tripod for photo and VTR cameras with new structure by means of which the vertical swing movements of the pan head can be locked while the horizontal swing movement is allowed, or both the horizontal and vertical swing movements can be simultaneously locked by means of one clamping knob.

SUMMARY OF THE INVENTION

The pan head mounting head of a tripod for photo and VTR cameras of the present invention is such that a horizontal shaft is set in such a manner as to be freely turnable about a vertical shaft installed upon the top of the tripod and upon which the horizontal shaft is disposed, and a head member fixing the pan head upon its top end is set in a freely turnable manner about the horizontal shaft. Within the pan head mounting head of the tripod, a slit is formed with a predetermined gap is defined in connection with the horizontal shaft hole defined within the head member set in a freely turnable manner about the horizontal shaft, and a knob shaft of a clamping knob is threadedly engaged within the head member so as to narrow the gap of the slit, thus causing the horizontal shaft slit gap to be narrowed in conjunction with the narrowing of the gap of a slit formed with a predetermined gap within the head member, which also includes a vertical shaft hole provided within a central portion of the head member. By clamping the outer periphery of the horizontal shaft by means of the constriction of the inner peripheral wall of the head member defining the horizontal shaft hole within the head member, at an intermediate rotational position of the knob shaft, the vertical swing movement is locked. By clamping the outer periphery of the vertical shaft by means of the constriction of the inner peripheral wall of the horizontal shaft defining the vertical shaft hole within the horizontal shaft due to the further clamping rotation of the knob shaft, the horizontal swing movement is locked.

Moreover, it is also possible to achieve the pan head mounting head of such structure wherein a damper insert hole with a conical inner end is provided at the slit position of the horizontal shaft and a damper with one end shaped conically is inserted into the hole, thus resulting in the fact that the damper is disposed in close contact with the conical inner end of the damper insert hole at its conical end and is in sliding contact with the vertical shaft at its other end.

Furthermore, it is preferable that the knob shaft protruding from the head member is sloped at angles with respect to the vertical shaft and horizontally with respect to the back, respectively.

In addition, it is preferable that locating marks indicating the limit position to which the knob shaft is to be turned or rotated for locking the vertical swing movement only are stamped at the base end of the knob and the knob insert position of the head member.

In the above-mentioned structure, the horizontal swing and vertical swing movements are locked by means of one knob shaft. In the state where the knob shaft is left unclamped, both the condition where the horizontal shaft hole defined within the head member is freely disposed about the horizontal shaft and the condition where the vertical shaft hole defined within the horizontal shaft is freely disposed about the vertical shaft of the vertical shaft member are maintained, thus permitting the horizontal swing and vertical swing movements to freely occur.

If the knob shaft is turned so as to achieve partial clamping, the slit gap of the head member is narrowed. As a result, the horizontal shaft inserted into the horizontal shaft hole of the head member in a freely turnable manner now comes into close contact with the periphery of the wall of the head member defining the horizontal shaft hole therein so as to lock the turning of the head member relative to the horizontal shaft, thus locking the vertical swing movement.

If the knob shaft is turned further from this state so as to achieve complete clamping, the slit gap of head member is narrowed further. As a result, the inner wall of the head member defining the horizontal shaft hole is pressed against the outer periphery of the horizontal shaft so as to narrow the gap of the slit defined within the horizontal shaft. The narrowing of the slit gap within the horizontal shaft causes the vertical shaft hole defined within the horizontal shaft to be constricted smaller in diameter and bring it into close contact with the outer periphery of the vertical shaft, thus locking the horizontal swing movement.

In the structure where a damper is inserted into the slit of the horizontal shaft, as the slit gap is narrowed, the damper brings the vertical shaft into close contact with the inner wall of the vertical shaft hole defined within the horizontal shaft, thus locking the relative rotation of the horizontal shaft with respect to the vertical shaft more firmly.

As mentioned above, in the pan head mounting head of the tripod for photo and VTR cameras of the present invention, one pan rod for swinging and shifting the pan head to the photographing position is provided, and by changing the degree of clamping of this rod, the vertical swing movement or both the vertical and horizontal swing movements can be locked. Therefore, the photographing position can be controlled by means of one hand, thus permitting easy photographing particularly by means of a VTR camera. Moreover, the mechanism of the present invention is very simple, thus leading to a reduction in the number of man-hours for assembling the same and to a more durable structure. Therefore, the practical effect of this invention after it has been put into use will be very significant.

BRIEF DESCRIPTION OF THE DRAWINGS

Various other features and attendant advantages of the present invention will become more apparent from the following detailed description, when considered in connection with the accompanying drawings, in which like reference characters designate like or corresponding parts throughout the several views, and wherein.

DETAILED DESCRIPTION OF THE PREFERRED EMBODIMENTS

Figure 1:
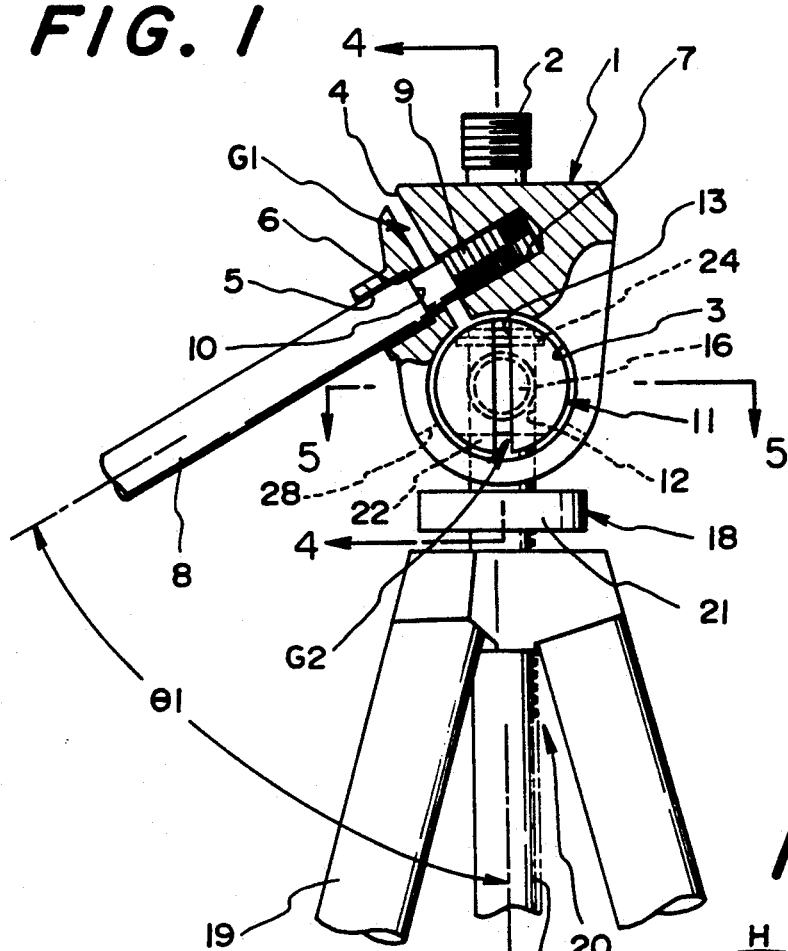
FIG. 1 is a front view of the tripod head in a partially cut-off state showing the first embodiment of the pan head mounting head of the tripod for photo and VTR cameras of the present invention.
Figure 2:
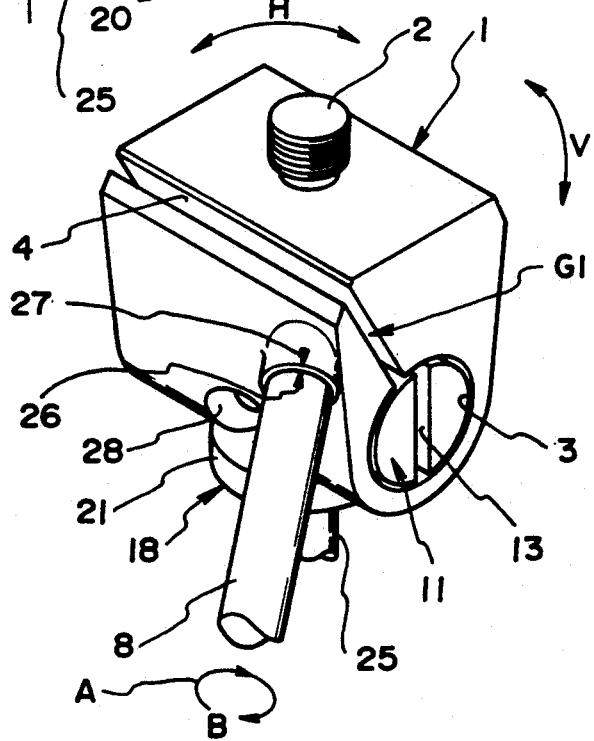
FIG. 2 is a perspective view of the head.
Figure 3:
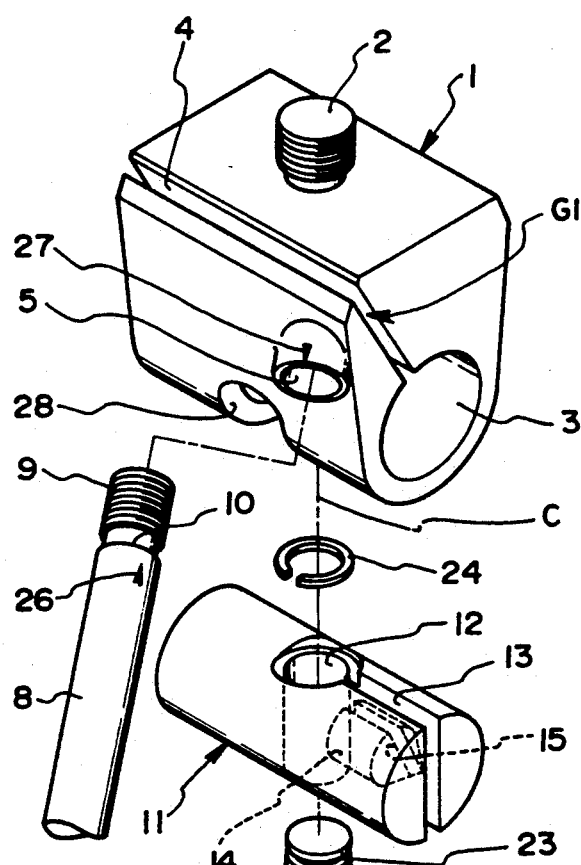
FIG. 3 is a perspective view of the head in a disassembled state.
Figure 4:
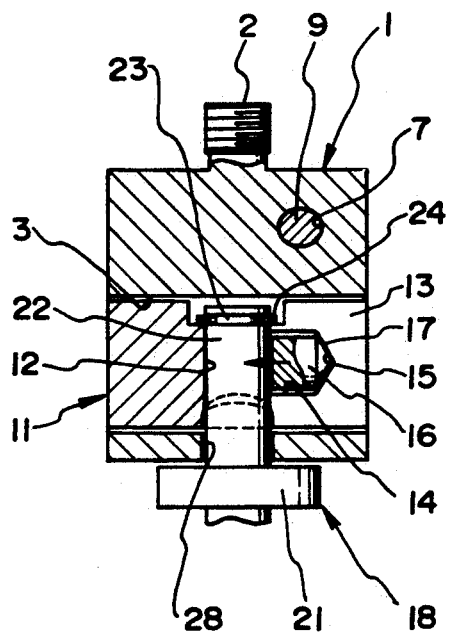
FIG. 4 is a cross-sectional view of the head of FIG. 1 taken along the line 4—4 of FIG. 1.
Figure 5:
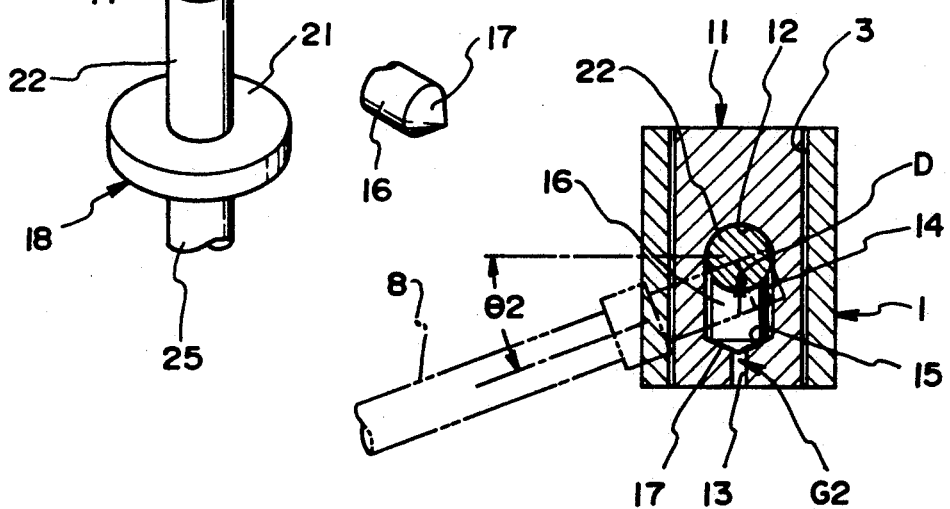
FIG. 5 is a cross-sectional view of the head of FIG. 1 taken along the line 5—5 of FIG. 1.

In the following, the embodiments of the pan head mounting head of the tripod for photo and VTR cameras of the present invention will be described with reference to the drawings.

FIGS. 1 to 5 show the first embodiment of this invention. The numeral 1 denotes a head member upon which a desired pan head may be fixed by means of pan head mounting screw 2 mounted at the center of the top end of the head 1. Through the head member 1, a horizontal shaft hole 3 of columnar shape intersecting the central axis C of pan head mounting screw 2 passes. A slit 4 having a gap G1 extending from the vicinity of the top of head member 1 toward the axial center of horizontal shaft hole 3 is defined within head member 1. Moreover, the head member 1 has a cylindrical bottom portion which is substantially concentric with the horizontal shaft hole 3. Within the bottom portion, an enlongated arcuate hole 28 is made in the direction intersecting the axis of the horizontal shaft hole 3 and including the central axis C of the mounting screw 2. Furthermore, upon the end side of head member 1 with the slit 4 defined between, a knob insert hole 5 having an inner stepped portion 6 is provided, and at the internally extended position of the knob shaft insert hole 5 on the base side of the head 1 there is provided a female screw or threaded portion 7, which mates with a male screw or threaded portion 9 provided upon the top end of knob shaft 8 of a clamping knob called the pan rod, thus causing the shoulder 10 of the shaft 8 to be engaged with the inner stepped portion 6 of the knob shaft insert hole 5. As a result, by turning the knob shaft 8 to the right (in the direction of arrow A), the gap G1 of slit 4 is narrowed.

The numeral 11 denotes a horizontal shaft of columnar shape inserted in a freely turnable manner into the horizontal shaft hole 3 defined within the head member 1. At its center, a vertical shaft hole 12 intersecting the axial center of the shaft 11 is provided, and a slit 13 having a gap G2 extending toward the axial center of the vertical shaft hole 12 is formed. Moreover, at the axial center of horizontal shaft 11 located within the slit 13, a damper insert hole 14 of columnar shape with its outer end shaped as a conical end 15 is provided, and a damper 16 with one end shaped as a conical end 17 is inserted into the damper insert hole 14. The damper 16 is small enough with respect to its outside diameter as compared with the inside diameter of the damper insert hole 14 so as to define a gap with respect to hole 14 along its outer periphery, and is of such structure that when its conical end 17 is in close contact with the conical inner end 15 of hole 14, the other end of damper 16 is positioned so as to be disposed substantially coincident with the inner wall of the vertical shaft hole 12.

The numeral 18 denotes a vertical shaft member to be mounted by means of a lifting mechanism 20 in the case of this embodiment upon the top of tripod 19. The vertical shaft 22 protruding onto the upper surface of flange 21 is inserted by means of elongated hole 28 defined within the head member 1 into the vertical shaft hole 12 defined within the horizontal shaft 11 in a freely turnable manner and is set in position by means of a retainer ring 24 fitted into annular groove 23 formed upon the top end of the vertical shaft 22. Then, a rack shaft 25 extending along the lower end of the vertical shaft member 18 is engaged with a rack pinion (not shown) of the lifting mechanism 20, thus constituting an integral part of the legs of tripod 19.

In the above-mentioned structure, the knob shaft 8 should preferably be sloped at an angle of $\theta 1$ (approximately 60°) with respect to the vertical shaft and at an angle of $\theta 2$ (approximately 20°) with respect to a plane disposed perpendicular to the plane of slit 13.

In the pan head mounting head of the tripod for photo and VTR cameras having the structure as mentioned above, the horizontal swing (in the direction of arrow H) and the vertical swing (in the direction of arrow V) are locked by means of one pan rod, that is knob shaft 8. In the state where the knob shaft 8 is left unclamped, both the condition where the horizontal shaft hole 3 defined within the head member 1 is freely disposed about or separated from the horizontal shaft 11 and the condition where the vertical shaft hole 12 defined within the horizontal shaft is freely disposed about or separated from the vertical shaft 22 of vertical shaft member 18 are maintained, thus permitting the horizontal swing (in the direction of arrow H) and the vertical swing (in the direction of arrow V) movements to freely occur.

If the knob shaft 8 is turned clockwise in to the direction of arrow A, the male screw 9 is engaged with the female screw 7 provided upon the base side of head member 1 and is shifted in position so as to draw the end side where the inner stepped portion 6 is engaged with the shoulder 10 near the base of head member 1, thus causing the gap G1 of slit 4 to be narrowed. As this gap G1 is narrowed, the horizontal shaft 11 inserted in a freely turnable manner within the horizontal shaft hole 3 comes into close contact with the periphery of the hole 3 so as to lock the turning movement of the head 1 relative to shaft 11, thus locking the vertical swing (in the direction of arrow V) movement of the housing or head member 1. At this time, the condition where the vertical shaft hole 12 defined within the horizontal shaft 11 is disposed about the vertical shaft 22 of vertical shaft member 18 so as to be maintained at the initial state, thus permitting the horizontal swing (in the direction of arrow H) movement to freely occur.

If the knob shaft 8 is turned further in the direction of arrow B from this state, the gap G1 of slit 4 is narrowed still further. As a result, the inner wall of horizontal shaft hole 3 is pressed against the outer periphery of horizontal shaft 11 still further so as to, in turn, narrow the gap G2 of slit 13. Within the slit 13, the damper 16 is inserted into the damper insert hole 14, and its conical end 17 is in contact with the conical inner end 15 and is disposed intermediate between the vertical shaft 22 of vertical shaft member 18 inserted into the vertical shaft hole 12, and inner end 15 of shaft 11. Therefore, as the gap G2 of slit 13 is narrowed, the damper 16 moves in the direction of arrow D and brings the vertical shaft 22 into close contact with the inner wall of veritcal shaft hole 12 so as to lock the relative turning movement of head member 1 with respect to shaft 22, thus leading to the locking of the horizontal swing movement in the direction of arrow H. In this way, the pan head is completely locked at a desired position in a horizontal sense in the direction of arrow H simultaneously with the locking of the vertical swing movement in the direction of arrow V achieved by means of initial clamping of the knob shaft 8 as mentioned above.

Consequently, if the photographing direction is determined by operating the clamping knob (pan rod) and the knob shaft 8 is turned by means of the clamping knob up to the limit of the arrow A, only the vertical swing movement in the direction of arrow V is locked. By turning the knob shaft 8 further in the direction of arrow B, the vertical swing movement in the direction of arrow V and horizontal swing (the direction of arrow H) are simultaneously locked. Therefore, it is preferable that locating marks 26, 27 showing the limit position of the rotary movement in the direction of arrow A for locking the vertical swing movement only are stamped upon the base end of knob shaft 8 and the edge of the collar defining the entrance to knob insert hole 5 as a standard for the clamping operation.

Figure 6:
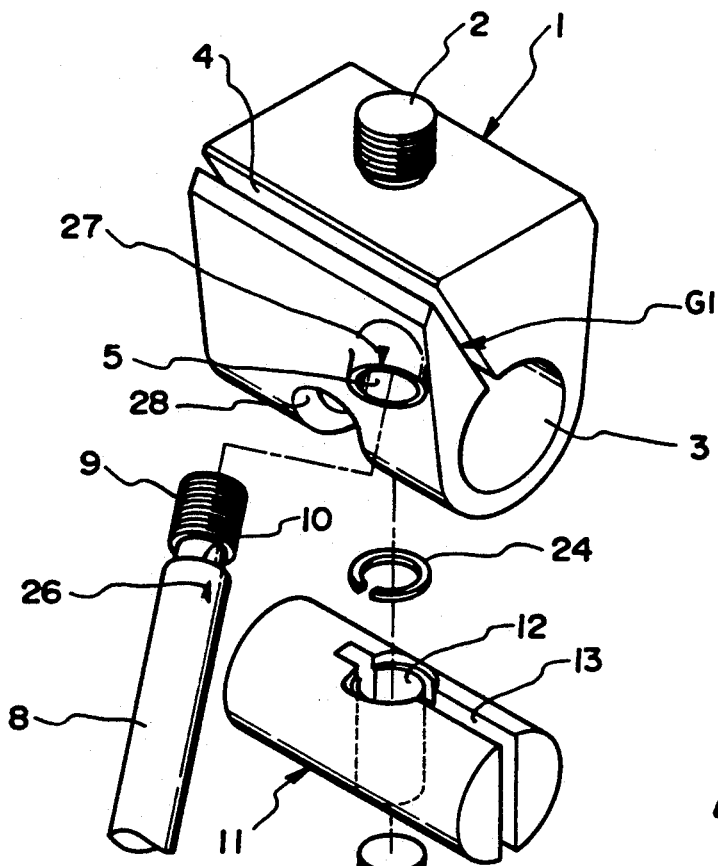
FIG. 6 is a perspective view of the head in a disassembled state showing another embodiment of the head of this invention.
Figure 7:
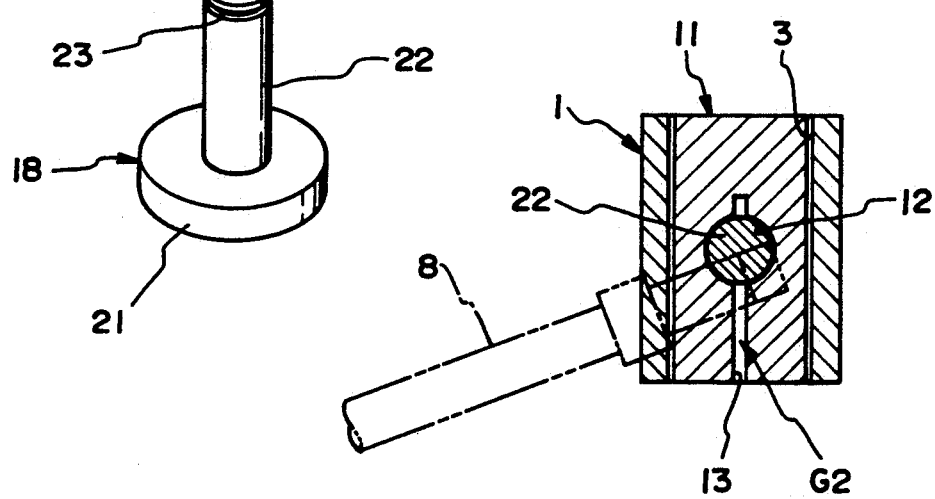
FIG. 7 is a cross-sectional view showing the main portion of the head of FIG. 6.

Next, FIGS. 6 and 7 show the second embodiment of this invention.

Referring only to the points of difference in its structure from that of the first embodiment as described above, the damper 16 is omitted and the damper insert hole 14 in the horizontal shaft 11 is also excluded in this embodiment. The slit 13 having the gap G2 extends up to the vertical shaft hole 12, and the vertical shaft 22 of vertical shaft member 18 is inserted in a freely turnable manner into the vertical shaft hole 12. Therefore, as the gap G2 is narrowed, the vertical shaft hole is accordingly contracted in diameter so as to come into close contact with the outer periphery of vertical shaft 22, thus locking the horizontal swing movement in the direction of arrow H.

Also in the structure of the pan head mounting head according to the second embodiment as mentioned above, as is the case with the first embodiment, if the photographing direction is determined by operating the pan rod and the knob shaft 8 is turned by means of the clamping knob up to the limit of arrow A, only the vertical swing movement in the direction of arrow V is locked. By turning the knob shaft 8 further in the direction of arrow B, the vertical swing movement in the direction of arrow V and the horizontal swing movement in the direction of arrow H are simultaneously locked.

While the invention has been particularly described with reference to its most preferred embodiment, it will be apparent that various other modifications and changes may be made to the present invention described above without departing from the spirit and scope thereof. Therefore, the present invention is not limited only to its particular embodiments.

We claim:

1. A pan head mounting head for a tripod, comprising:
   a vertical shaft disposed upon said tripod;
   a horizontal shaft pivotably mounted upon said vertical shaft so as to be movable within a horizontal plane about a vertical axis of said vertical shaft, said horizontal shaft having a slit defined within one end thereof and extending up to a bore defined within said horizontal shaft and within which said vertical shaft is disposed;
   a head member upon which said pan head is to be mounted, said head member having a bore extending therethrough throughout its entire length for housing said horizontal shaft such that said head member can be pivotably moved relative to said horizontal shaft about a horizontal axis of said horizontal shaft, and a slit defined within a sidewall portion of said head member and extending from an external surface of said head member to said bore of said head member and throughout said entire length of said head member; and
   a knob shaft threadedly engaged within said head member and interconnecting portions of said head member disposed upon opposite sides of said slit defined within said head member such that upon rotation of said knob shaft in a predetermined threaded direction, said slit of said head member can be narrowed along said entire length thereof whereby said bore of said head member can be constricted along said entire length thereof so as to tightly engage said horizontal shaft along said entire length thereof when said knob shaft is rotated in said predetermined direction to a first predetermined degree, and in turn narrow said slit of said horizontal shaft so as to constrict said bore of said horizontal shaft so as to tightly engage said vertical shaft when said knob shaft is rotated in said predetermined direction to a second predetermined degree which is greater than said first predetermined degree, whereby locking of said head member relative to said horizontal shaft, and locking of said horizontal shaft relative to said vertical shaft, can be achieved.

2. A pan head mounting head for a tripod as set forth in claim 1, wherein a damper insert hole with a conical outer end is made at the slit position of said horizontal shaft and a damper with one end shaped conically is inserted into the hole, thus resulting in that said damper is in close contact with the conical outer end of said damper insert hole at its conical end and is in sliding contact with the vertical shaft at its other end.

3. A pan head mounting head for a tripod as set forth in claim 1, wherein the knob shaft protrudes from said head member and is sloped at angles from the vertical shaft and horizontally from a back surface of said head member, respectively.

4. A pan head mounting head for a tripod as set forth in claim 1, wherein locating marks indicating the limit turning position of said knob shaft and corresponding to said first predetermined degree for locking the vertical swing only of said head member relative to said horizontal shaft are stamped at a base end of said knob shaft and a knob insert position of said head member.

5. A pan head mounting head as set forth in claim 1, wherein:
said tripod comprises means for supporting photographic and VTR cameras.

6. A pan head mounting head as set forth in claim 1, wherein:
said head member comprises a threaded bore defined within one of said portions disposed upon said opposite sides of said slit defined within said head member for threadedly engaging a threaded end portion of said knob shaft, and a stepped portion defined within another one of said portions disposed upon said opposite sides of said slit defined within said head member for engaging a shoulder portion of said knob shaft, whereby said slit of said head member can be narrowed so as to constrict said bore of said head member as said knob shaft is rotated in said predetermined threaded direction.

7. A pan head mounting head as set forth in claim 1, further comprising:
elongated hole means defined within an external sidewall portion of said head member and disposed within a plane transverse to said horizontal axis of said horizontal shaft for accommodating said vertical shaft and permitting said head member to pivotably move about said horizontal axis of said horizontal shaft and relative to said vertical shaft.

* * * * *